United States Patent
Bisani et al.

(10) Patent No.: US 9,286,897 B2
(45) Date of Patent: Mar. 15, 2016

(54) SPEECH RECOGNIZER WITH MULTI-DIRECTIONAL DECODING

(71) Applicant: Amazon Technologies, Inc., Reno, NV (US)

(72) Inventors: Michael Maximilian Emanuel Bisani, Limburg (BE); Nikko Strom, Kirkland, WA (US); Bjorn Hoffmeister, Seattle, WA (US); Ryan Paul Thomas, Redmond, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 63 days.

(21) Appl. No.: 14/039,383

(22) Filed: Sep. 27, 2013

(65) Prior Publication Data

US 2015/0095026 A1 Apr. 2, 2015

(51) Int. Cl.
| | |
|---|---|
| *G10L 15/32* | (2013.01) |
| *G10L 15/16* | (2006.01) |
| *G10L 21/0272* | (2013.01) |
| *G10L 25/78* | (2013.01) |
| *G10L 15/08* | (2006.01) |
| *G10L 21/0216* | (2013.01) |

(52) U.S. Cl.
CPC ............... *G10L 15/32* (2013.01); *G10L 15/08* (2013.01); *G10L 15/16* (2013.01); *G10L 21/0272* (2013.01); *G10L 25/78* (2013.01); *G10L 2021/02166* (2013.01)

(58) Field of Classification Search
CPC ............... G10L 2021/02166; G10L 21/0272; G10L 25/78
See application file for complete search history.

(56) References Cited

U.S. PATENT DOCUMENTS

| | | | |
|---|---|---|---|
| 6,009,396 A * | 12/1999 | Nagata | 704/270 |
| 6,363,345 B1 | 3/2002 | Marash et al. | |
| 6,526,148 B1 * | 2/2003 | Jourjine et al. | 381/94.7 |
| 2003/0069727 A1 | 4/2003 | Krasny et al. | |
| 2003/0204397 A1 | 10/2003 | Amiri et al. | |
| 2004/0143435 A1 | 7/2004 | Deng et al. | |
| 2005/0049864 A1 * | 3/2005 | Kaltenmeier et al. | 704/233 |
| 2006/0075422 A1 | 4/2006 | Choi et al. | |
| 2007/0033042 A1 * | 2/2007 | Marcheret et al. | 704/255 |
| 2008/0270131 A1 * | 10/2008 | Fukuda | G10L 21/0272 704/246 |
| 2008/0317259 A1 | 12/2008 | Zhang et al. | |
| 2009/0037171 A1 * | 2/2009 | McFarland | G10L 15/26 704/235 |
| 2009/0150146 A1 * | 6/2009 | Cho et al. | 704/233 |
| 2010/0070274 A1 * | 3/2010 | Cho et al. | 704/233 |
| 2010/0217590 A1 * | 8/2010 | Nemer et al. | 704/233 |
| 2012/0065976 A1 * | 3/2012 | Deng et al. | 704/256.1 |

OTHER PUBLICATIONS

International Search Report of PCT/US14/56022, Mailed Dec. 30, 2014, Applicant: Amazon Technologies, Inc., 3 pages.

* cited by examiner

*Primary Examiner* — Richemond Dorvil
*Assistant Examiner* — Bryan Blankenagel
(74) *Attorney, Agent, or Firm* — Seyfarth Shaw LLP; Ilan N. Barzilay; Alvin Fashu-Kanu

(57) ABSTRACT

In an automatic speech recognition (ASR) processing system, ASR processing may be configured to process speech based on multiple channels of audio received from a beamformer. The ASR processing system may include a microphone array and the beamformer to output multiple channels of audio such that each channel isolates audio in a particular direction. The multichannel audio signals may include spoken utterances/speech from one or more speakers as well as undesired audio, such as noise from a household appliance. The ASR device may simultaneously perform speech recognition on the multi-channel audio to provide more accurate speech recognition results.

19 Claims, 12 Drawing Sheets

SPEECH RECOGNIZER WITH MULTI-DIRECTIONAL DECODING

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data, which may then be provided to various textual based programs and applications.

Computers, hand-held devices, telephone computer systems, kiosks, and a wide variety of other devices to improve human-computer interactions may use speech recognition.

BRIEF DESCRIPTION OF DRAWINGS

For a more complete understanding of the present disclosure, reference is now made to the following description taken in conjunction with the accompanying drawings.

DETAILED DESCRIPTION

Automatic speech recognition (ASR) techniques enable a user to speak into an audio capture device (e.g., audio input/capture element and/or microphone) and have audio signals including speech translated into a command that is recognized by an ASR device. While audio input to a device may include speech from one or more users, it may also include background noise such as audio from other sources (e.g. other individuals, background audio from appliances, etc.). The audio from the other sources may originate from different directions, which further complicates the reception and processing of a desired audio. Further, the audio from these other sources may make it more difficult for the ASR device to interpret speech from a user for processing.

Offered is a method for processing speech based on multiple channels of audio received from a beamformer. In one aspect of the disclosure, an ASR device may be equipped with a microphone array and a beamformer, and the beamformer may output multiple channels of audio such that each channel isolates audio in a particular direction. The ASR device receives the multi-channel audio from the beamformer. The multichannel audio signals may include spoken utterances/speech from one or more speakers as well as undesired audio, such as noise from a household appliance. The ASR device may simultaneously perform speech recognition on the multichannel audio to provide more accurate speech recognition results.

Figure 1:
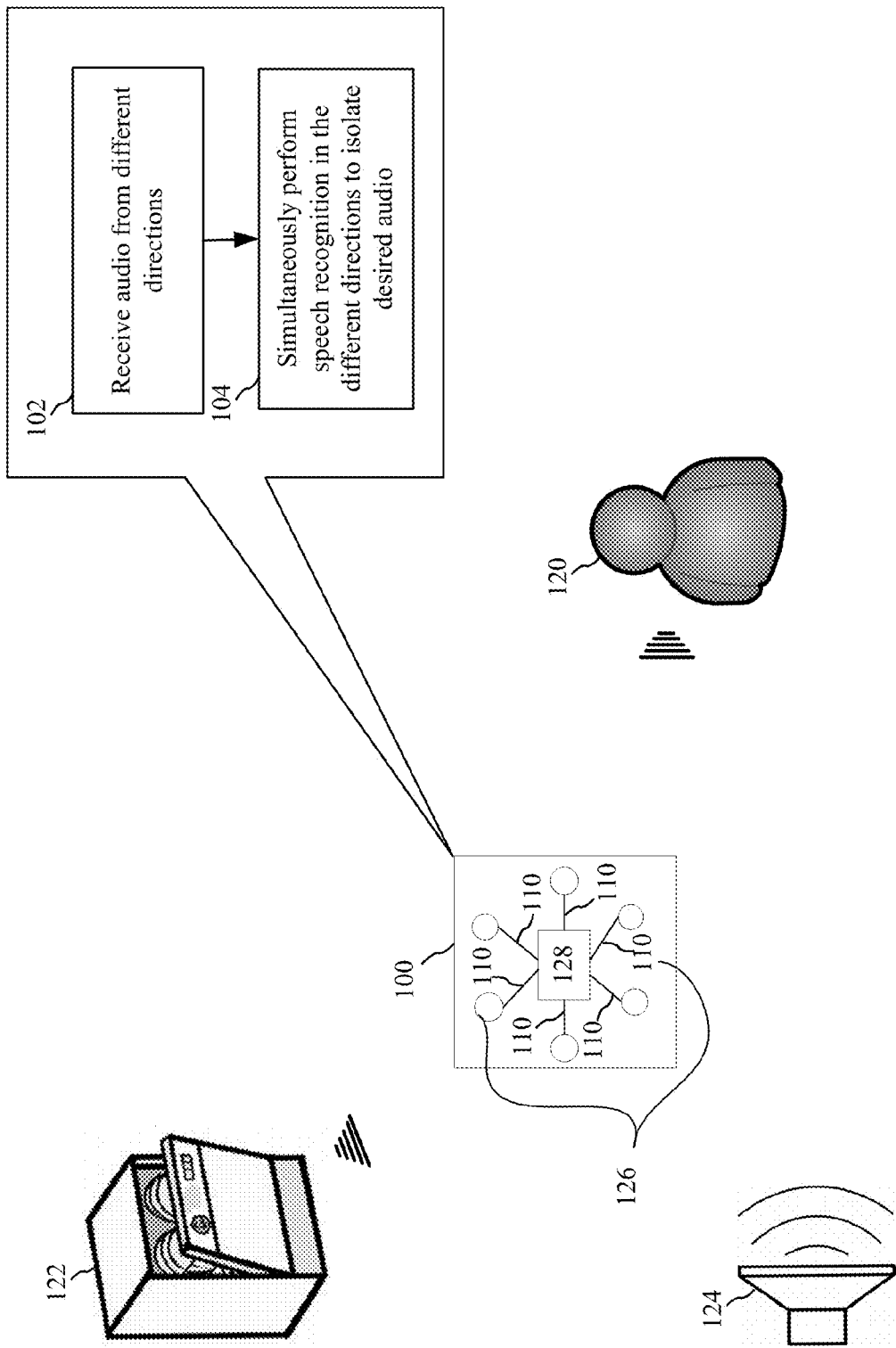
FIG. 1 illustrates one technique for decoding multiple channels of audio from a beamformer according to one aspect of the present disclosure.

FIG. 1 illustrates a method for processing speech according to aspects of the present disclosure. FIG. 1 includes an ASR device 100 having a microphone array 126, including a beamformer module 128, with a user 120, a dishwasher 122 and a stereo speaker 124, positioned around the ASR device 100. Although the microphone array is illustrated in a circular configuration, the microphone array may be arranged in other microphone array configurations (including those with multiple arrays) to facilitate receiving audio signals from different directions. The ASR device 100 may receive audio, including speech from the user and/or other audio from the dishwasher 122, stereo output 124, etc. from multiple directions, as shown in block 102. The reception of the speech from the user and the reception of audio from the other sources may be simultaneous. A number of beams, illustrated by lines 110, represent directions that may be isolated by the beamformer 128. In one aspect of the disclosure, the ASR device 100 simultaneously performs speech recognition on multiple channels of audio data to improve speech recognition results.

Figure 2:
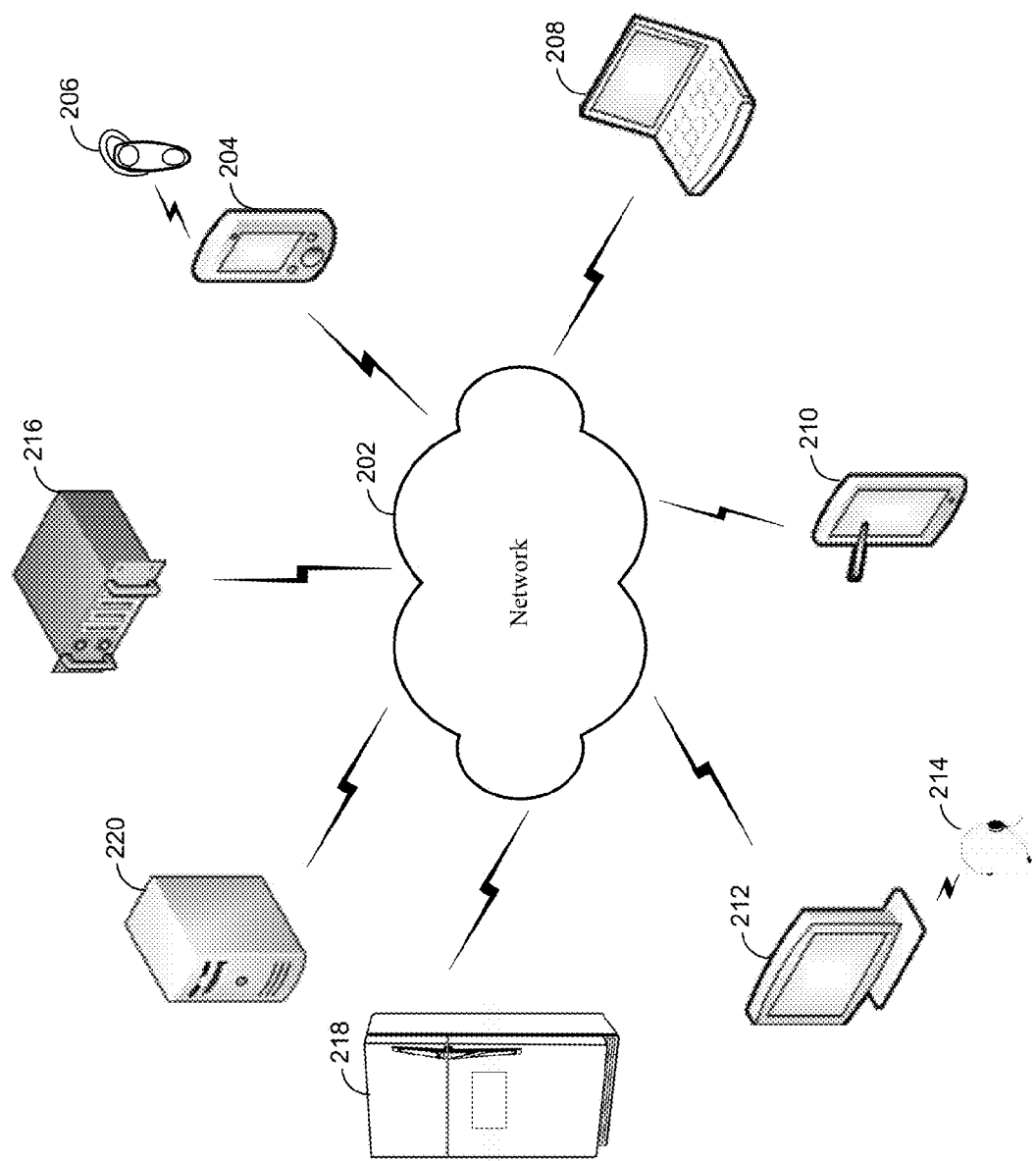
FIG. 2 illustrates a computer network for use with distributed speech recognition according to one aspect of the present disclosure.

The techniques described here may be performed on a local device, such as the ASR device 100, a networked device, or some combination of different devices. For example, a local device may receive multi-channel audio data and send the audio data to a remote device for processing. The remote device may then perform ASR processing on the multi-channel audio to determine speech recognition. Alternatively, the local device and remote device may work together in other ways. These multiple ASR devices may be connected over a network. As shown in FIG. 2 multiple devices may be connected over network 202. Network 202 may include a local or private network or may include a wide network such as the internet. Devices may be connected to the network 202 through either wired or wireless connections. For example, a wireless device 204 may be connected to the network 202 through a wireless service provider. Other devices, such as computer 212, may connect to the network 202 through a wired connection. Other devices, such as a refrigerator 218, for example, located in a home or shopping establishment, may connect to the network 202 through a wired or wireless connection. Other devices, such as laptop 208 or tablet computer 210 may be capable of connection to the network 202 using various connection methods including through a wireless service provider, over a WiFi connection, or the like. Networked devices may input spoken audio through a number of audio input devices including through headsets 206 or 214. Audio input devices may be connected to networked devices either through a wired or wireless connection. Networked devices may also include embedded audio input devices, such as an internal microphone (not pictured) in laptop 208, wireless device 204 or table computer 210.

In certain ASR system configurations, one device may capture an audio signal and another device may perform the ASR processing. For example, audio input to the headset 214 may be captured by computer 212 and sent over the network 202 to computer 220 or server 216 for processing. Alternatively, computer 212 may partially process the audio signal before sending it over the network 202. Because ASR processing may involve significant computational resources, in terms of both storage and processing power, such split configurations may be employed where the device capturing the audio has lower processing capabilities than a remote device and higher quality ASR results are desired. The audio capture may occur near a user and the captured audio signal sent to another device for processing. For example, one or more microphone arrays may be located in different locations from an ASR device and the captured audio may be sent from the arrays to the ASR device (or devices) for processing.

Figure 3:
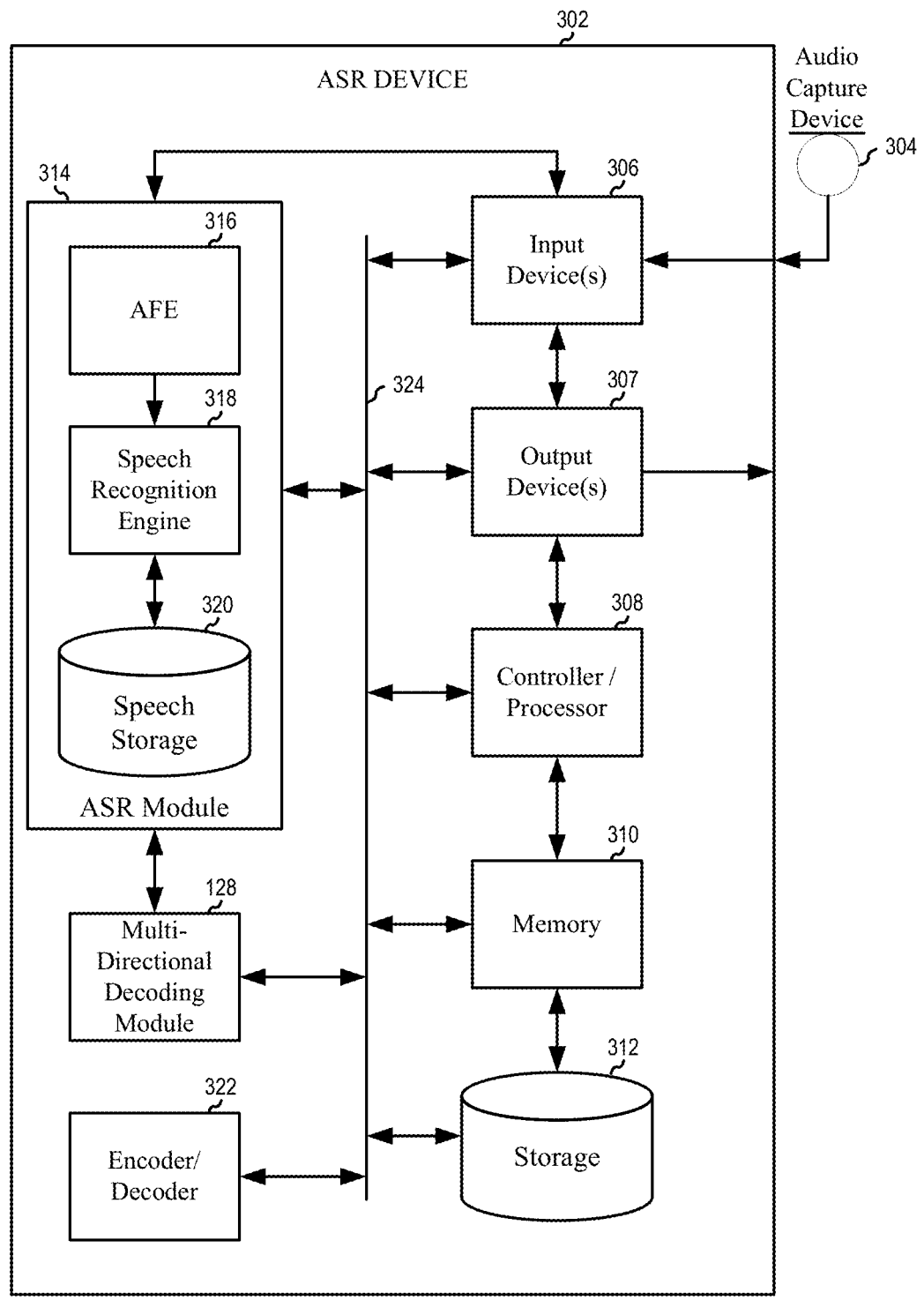
FIG. 3 is a block diagram conceptually illustrating a device for speech recognition according to one aspect of the present disclosure.

FIG. 3 shows an automatic speech recognition (ASR) device 302 for performing speech recognition. Aspects of the present disclosure include computer-readable and computer-executable instructions that may reside on the ASR device 302. FIG. 3 illustrates a number of components that may be included in the ASR device 302, however other non-illustrated components may also be included. Also, some of the illustrated components may not be present in every device capable of employing aspects of the present disclosure. Further, some components that are illustrated in the ASR device 302 as a single component may also appear multiple times in a single device. For example, the ASR device 302 may include multiple input devices 306, output devices 307 or multiple controllers/processors 308.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 3 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 302 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 3, the ASR device 302 may include an audio capture device 304 for capturing spoken utterances for processing. The audio capture device 304 may include a microphone or other suitable component for capturing sound. The audio capture device 304 may be integrated into the ASR device 302 or may be separate from the ASR device 302. The ASR device 302 may also include an address/data bus 324 for conveying data among components of the ASR device 302. Each component within the ASR device 302 may also be directly connected to other components in addition to (or instead of) being connected to other components across the bus 324. Although certain components are illustrated in FIG. 3 as directly connected, these connections are illustrative only and other components may be directly connected to each other (such as the ASR module 314 to the controller/processor 308).

The ASR device 302 may include a controller/processor 308 that may be a central processing unit (CPU) for processing data and computer-readable instructions and a memory 310 for storing data and instructions. The memory 310 may include volatile random access memory (RAM), non-volatile read only memory (ROM), and/or other types of memory. The ASR device 302 may also include a data storage component 312, for storing data and instructions. The data storage component 312 may include one or more storage types such as magnetic storage, optical storage, solid-state storage, etc. The ASR device 302 may also be connected to removable or external memory and/or storage (such as a removable memory card, memory key drive, networked storage, etc.) through the input device 306 or output device 307. Computer instructions for processing by the controller/processor 308 for operating the ASR device 302 and its various components may be executed by the controller/processor 308 and stored in the memory 310, storage 312, external device, or in memory/storage included in the ASR module 314 discussed below. Alternatively, some or all of the executable instructions may be embedded in hardware or firmware in addition to or instead of software. The teachings of this disclosure may be implemented in various combinations of software, firmware, and/or hardware, for example.

The ASR device 302 includes input device(s) 306 and output device(s) 307. A variety of input/output device(s) may be included in the device. Example input devices 306 include an audio capture device 304, such as a microphone (pictured as a separate component), a touch input device, keyboard, mouse, stylus or other input device. Example output devices 307 include a visual display, tactile display, audio speakers, headphones, printer or other output device. The input device 306 and/or output device 307 may also include an interface for an external peripheral device connection such as universal serial bus (USB), a high performance serial bus (e.g., FireWire), a hardware interface (e.g., Thunderbolt) or other connection protocol. The input device 306 and/or output device 307 may also include a network connection such as an Ethernet port, modem, etc. The input device 306 and/or output device 307 may also include a wireless communication device, such as radio frequency (RF), infrared, a wireless technology standard for exchanging data over short distances (e.g., Bluetooth), wireless local area network (WLAN) (such as WiFi), or wireless network radio, such as a radio capable of communication with a wireless communication network such as a Long Term Evolution (LTE) network, WiMAX network, 3G network, etc. Through the input device 306 and/or output device 307, the ASR device 302 may connect to a network, such as the Internet or private network, which may include a distributed computing environment.

The device may also include an ASR module 314 for processing spoken audio data into text. The ASR module 314 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 314, which then interprets the utterance based on the similarity between the utterance and models known to the ASR module 314. For example, the ASR module 314 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language model or grammar). Based on the considered factors and the assigned recognition score, the ASR module 314 may output the most likely words recognized in the audio data. The ASR module 314 may also output multiple alternative recognized words in the form of a lattice or an N-best list (described in more detail below).

While a recognition score may represent a probability that a portion of audio data corresponds to a particular phoneme or word, the recognition score may also incorporate other information, which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 314 may be connected to the bus 324, input device(s) 306 and/or output device(s) 307, audio capture device 304, encoder/decoder 322, controller/processor 308 and/or other component of the ASR device 302. Audio data sent to the ASR module 314 may come from the audio capture device 304 or may be received by the input device 306, such as audio data captured by a remote entity and sent to the ASR device 302 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 304 and input device 306 may be configured to adjust the audio data based on traditional tradeoffs of quality versus data size or other considerations.

The ASR module 314 includes an acoustic front end (AFE) 316, a speech recognition engine 318, and speech storage 320. The AFE 316 transforms audio data into data for processing by the speech recognition engine 318. The speech recognition engine 318 compares the speech recognition data with the acoustic, language, and other data models and information stored in the speech storage 320 for recognizing the speech contained in the original audio data. The AFE 316 and speech recognition engine 318 may include their own controller(s)/processor(s) and memory or they may use the controller/processor 308 and memory 310 of the ASR device 302, for example. Similarly, the instructions for operating the AFE 316 and speech recognition engine 318 may be located within the ASR module 314, within the memory 310 and/or storage 312 of the ASR device 302, or within an external device.

Figure 4:
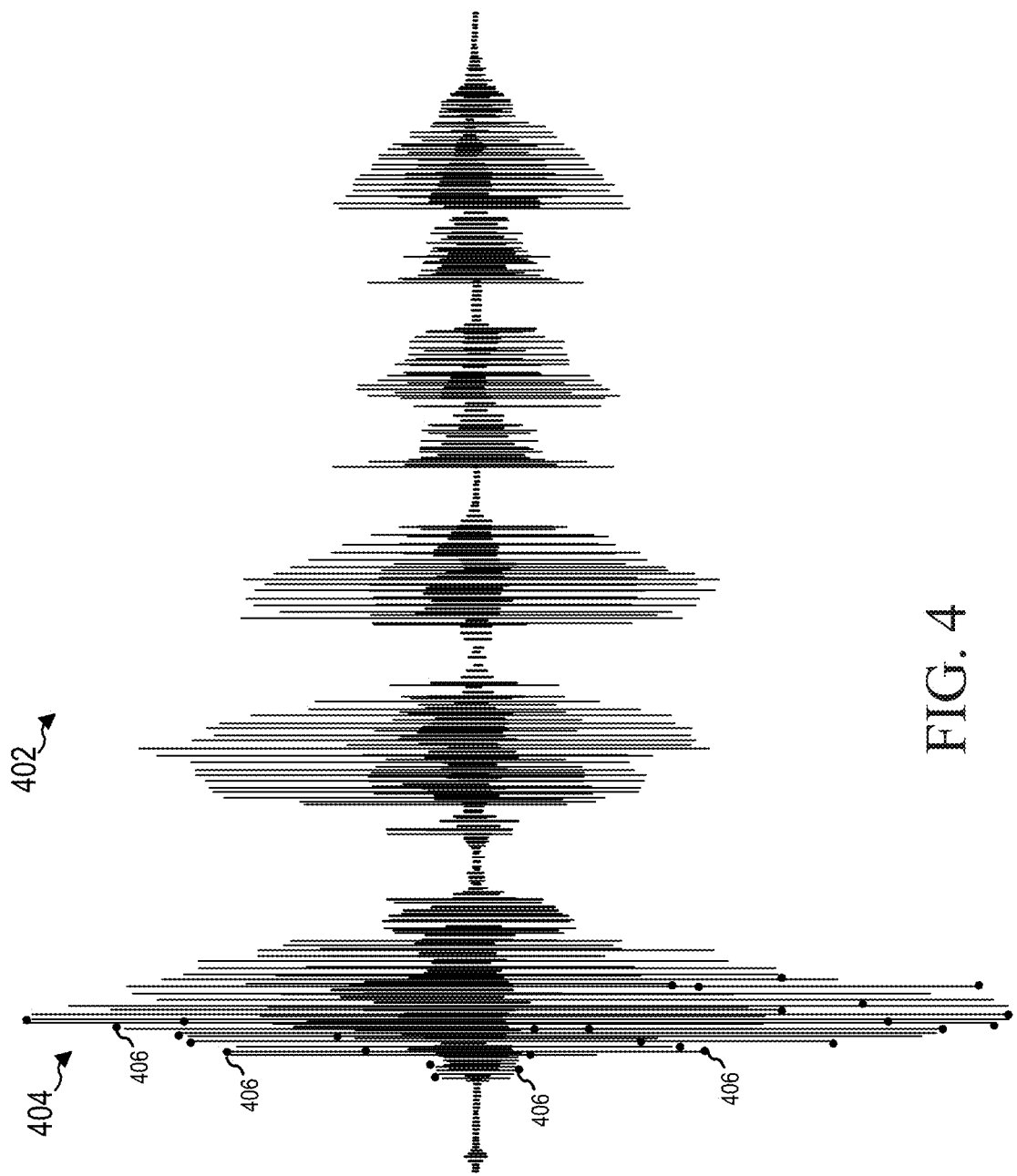
FIG. 4 illustrates an audio waveform processed according to one aspect of the present disclosure.

Received audio data may be sent to the AFE 316 for processing. The AFE 316 may reduce noise in the audio data, identify parts of the audio data containing speech for processing, and segment and process the identified speech components. The AFE 316 may divide the digitized audio data into frames or audio segments, with each frame representing a time interval, for example 10 milliseconds (ms). During that frame, the AFE 316 determines a set of values, called a feature vector, representing the features/qualities of the utterance portion within the frame. Feature vectors may contain a varying number of values, for example forty. The feature vector may represent different qualities of the audio data within the frame. FIG. 4 shows a digitized audio data waveform 402, with multiple points 406 of the first word 404 as the first word 404 is being processed. The audio qualities of those points may be stored into feature vectors. Feature vectors may be streamed or combined into a matrix that represents a time period of the spoken utterance. These feature vector matrices may then be passed to the speech recognition engine 318 for processing. A number of approaches may be used by the AFE 316 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 314 and sent to the output device 307 for transmission to another device for further processing. The feature vectors may be encoded and/or compressed by the encoder/decoder 322 prior to transmission. The encoder/decoder 322 may be customized for encoding and decoding ASR data, such as digitized audio data, feature vectors, etc. The encoder/decoder 322 may also encode non-ASR data of the ASR device 302, for example using a general encoding scheme such as .zip, etc. The functionality of the encoder/decoder 322 may be located in a separate component, as illustrated in FIG. 3, or may be executed by the controller/processor 308, ASR module 314, or other component, for example.

The speech recognition engine 318 may process the output from the AFE 316 with reference to information stored in the speech storage 320. Alternatively, post front-end processed data (such as feature vectors) may be received by the ASR module 314 from another source besides the internal AFE 316. For example, another entity may process audio data into feature vectors and transmit that information to the ASR device 302 through the input device(s) 306. Feature vectors may arrive at the ASR device 302 encoded, in which case they may be decoded (for example by the encoder/decoder 322) prior to processing by the speech recognition engine 318.

The speech storage 320 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 320 may also include a training corpus that may include recorded speech and/or corresponding transcription, that may be used to train and improve the models used by the ASR module 314 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 314. The training corpus may also include correctly recognized utterances as well as incorrectly recognized utterances. These incorrectly recognized utterances may include grammar errors, false recognition errors, noise, or other errors that provide the ASR module 314 with examples of error types and corresponding corrections, for example.

Other information may also be stored in the speech storage 320 for use in speech recognition. The contents of the speech storage 320 may be prepared for general ASR use or may be customized to include sounds and words that are likely to be used in a particular application. For example, for ASR processing at an ATM (automated teller machine), the speech storage 320 may include customized data specific to banking transactions. In certain instances, the speech storage 320 may be customized for an individual user based on his/her individualized speech input. To improve performance, the ASR module 314 may revise/update the contents of the speech storage 320 based on feedback of the results of ASR processing, thus enabling the ASR module 314 to improve speech recognition beyond the capabilities provided in the training corpus.

The speech recognition engine 318 attempts to match received feature vectors to words or subword units as known in the speech storage 320. A subword unit may be a phoneme, phoneme in context, syllable, part of a syllable, syllable in context, or any other such portion of a word. The speech recognition engine 318 computes recognition scores for the feature vectors based on acoustic information and language information. The acoustic information is used to calculate an acoustic score representing a likelihood that the intended sound represented by a group of feature vectors matches a subword unit. The language information is used to adjust the acoustic score by considering what sounds and/or words are used in context with each other, thereby improving the likelihood that the ASR module outputs speech results that make sense grammatically.

The speech recognition engine 318 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 318, the state may change or stay the same, based on the processing of the new feature vectors. A Viterbi algorithm may be used to find the most likely sequence of states based on the processed feature vectors.

Figure 5:
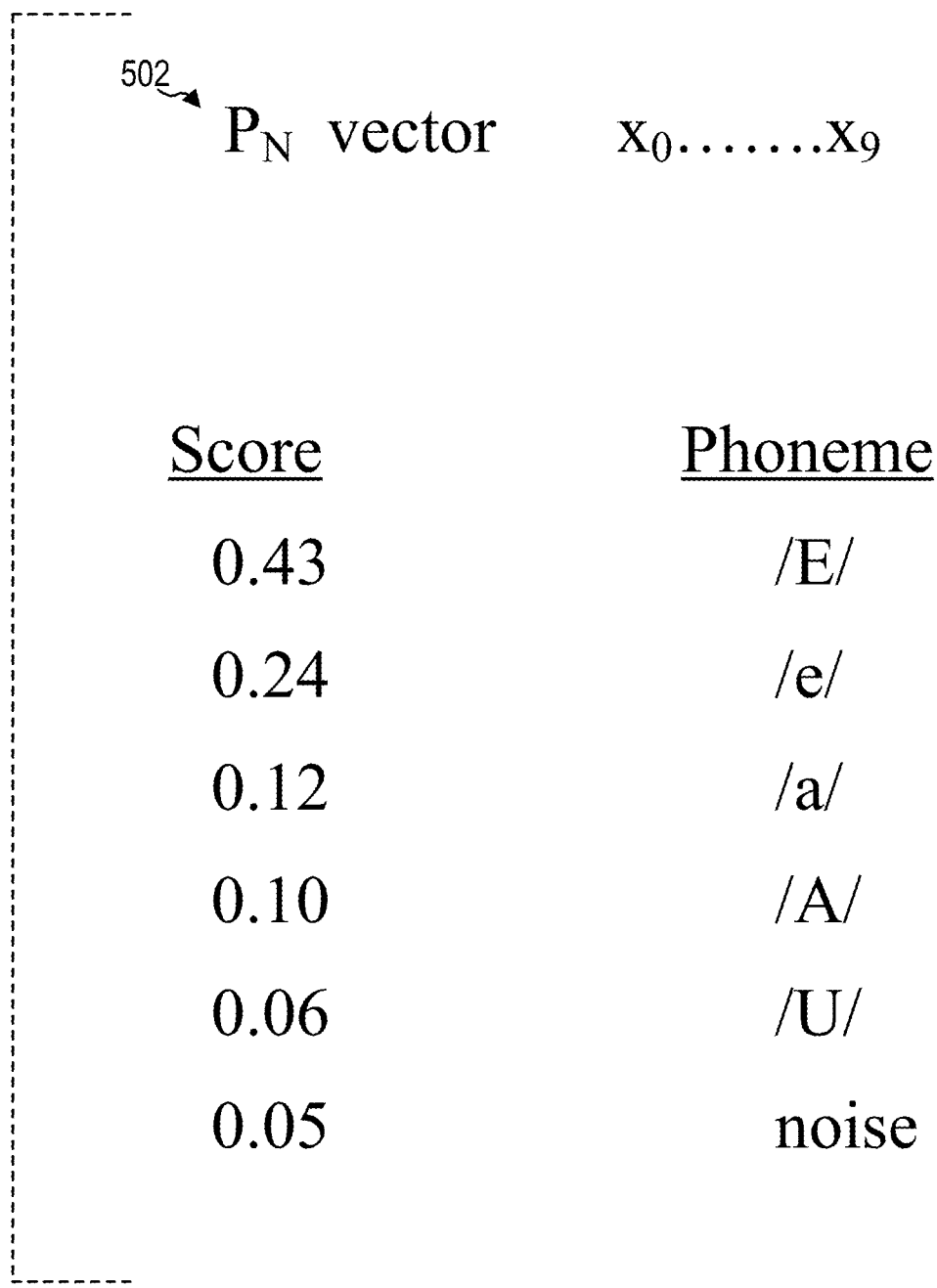
FIG. 5 illustrates phoneme processing according to one aspect of the present disclosure.

In one example, the speech recognition engine 318 may receive a series of feature vectors for sound corresponding to a user saying "Hello, how are you today?" The speech recognition engine 318 may attempt to match each feature vector with a phoneme in the speech recognition database 320. For example, FIG. 5 shows a series of feature vectors 502 corresponding to phoneme $P_N$ (representing the "e" sound in "hello"), including ten feature vectors $X_0$ through $X_9$. Upon processing of the first feature vector, the speech recognition engine 318 makes a preliminary determination as to the probability that the feature vector matches a phoneme, shown as the score in FIG. 5. Based on the feature vector, the phoneme /E/ may be assigned an initial score of 0.43, phoneme /e/ (a different pronunciation from /E/) may be assigned a score of 0.24, etc. The score may be based on how closely the feature vector matches a distribution associated with a phoneme state within one or more acoustic models stored in the speech storage 320. A feature vector may also be assigned a score that the feature vector represents noise or silence. In the example of FIG. 5, the score that the feature vector represents noise is 0.05.

Figure 6:
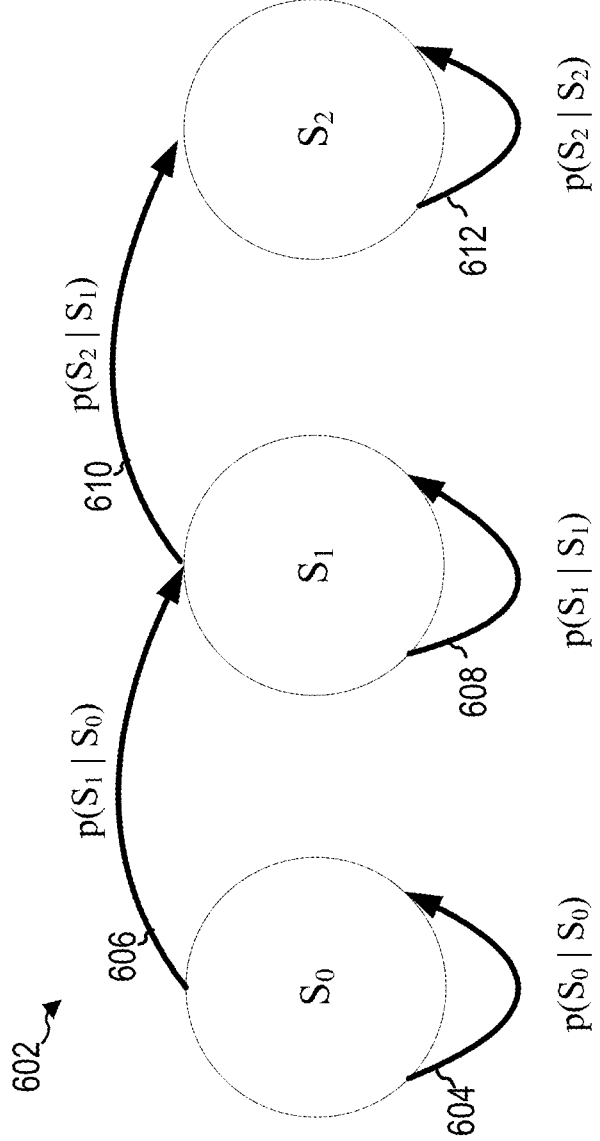
FIG. 6 illustrates phoneme processing in a Hidden Markov Model according to one aspect of the present disclosure.

Taking the example of the feature vector with a score of 0.43 for the phoneme /E/ shown in FIG. 5, the speech recognition engine 318 initially assigns a score of 0.43 that the feature vector matches the first state of the phoneme /E/, shown as state $S_0$ in the Hidden Markov Model illustrated in FIG. 6. After further processing, the speech recognition engine 318 determines whether the state should either remain the same, or change to a new state. For example, whether the state should remain the same 604 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent frames, the speech recognition engine 318 similarly determines whether the state should remain at $S_1$, using the transition probability represented by $P(S_1|S_1)$ 608, or move to the next state, using the transition probability $P(S_2|S_1)$ 610. As the processing continues, the speech recognition engine 318 continues calculating such probabilities including the probability 612 of remaining in state $S_2$ or the probability of moving from a state of illustrated phoneme /E/ to a state of another phoneme. After processing the feature vectors for state $S_2$, the speech recognition may move to the next phoneme in the utterance.

The probabilities and states may be calculated using a number of techniques. For example, probabilities for each state may be calculated using a Gaussian model, Gaussian mixture model, or other technique based on the feature vectors and the contents of the speech storage 320. Techniques such as maximum likelihood estimation (MLE) may be used to estimate the probability of phoneme states.

In addition to calculating potential states for one phoneme as a potential match to a feature vector, the speech recognition engine 318 may also calculate potential states for other phonemes, such as phoneme /e/ and/or phoneme /a/ for the example shown in FIG. 5 as potential matches for the feature vector. In this manner, multiple states and state transition probabilities may be calculated.

The probable states and probable state transitions calculated by the speech recognition engine 318 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 318 may also compute scores of branches of the paths based on language models or grammars. Language modeling involves determining scores for what words are likely to be used together to form coherent words and sentences. Application of a language model may improve the likelihood that the ASR module 314 correctly interprets the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance. The language modeling may be determined from a training corpus stored in the speech storage 320 and may be customized for particular applications.

As part of the language modeling (or in other phases of the ASR processing) the speech recognition engine 318 may, to save computational resources, prune and discard low recognition score states or paths that have little likelihood of corresponding to the spoken utterance, either due to low recognition score pursuant to the language model, or for other reasons. Further, during the ASR processing the speech recognition engine 318 may iteratively perform additional processing passes on previously processed utterance portions. Later passes may incorporate results of earlier passes to refine and improve results. As the speech recognition engine 318 determines potential words from the input audio the lattice may become very large as many potential sounds and words are considered as potential matches for the input audio. The potential matches may be illustrated as a word result network. A speech recognition result network is a connected network of arcs and nodes representing possible sequences of speech units that may be recognized and the likelihood of each sequence. A word result network is a speech recognition result network at the word level. Other level speech recognition networks are also possible. A result network may be generated by any type of speech recognition decoder (or engine). For example, a result network may be generated by an FST based decoder, as described in more detail below. A result network may be used to create a final set of speech recognition results, such as a lattice of the highest scoring results or an N-best list.

Figure 7:
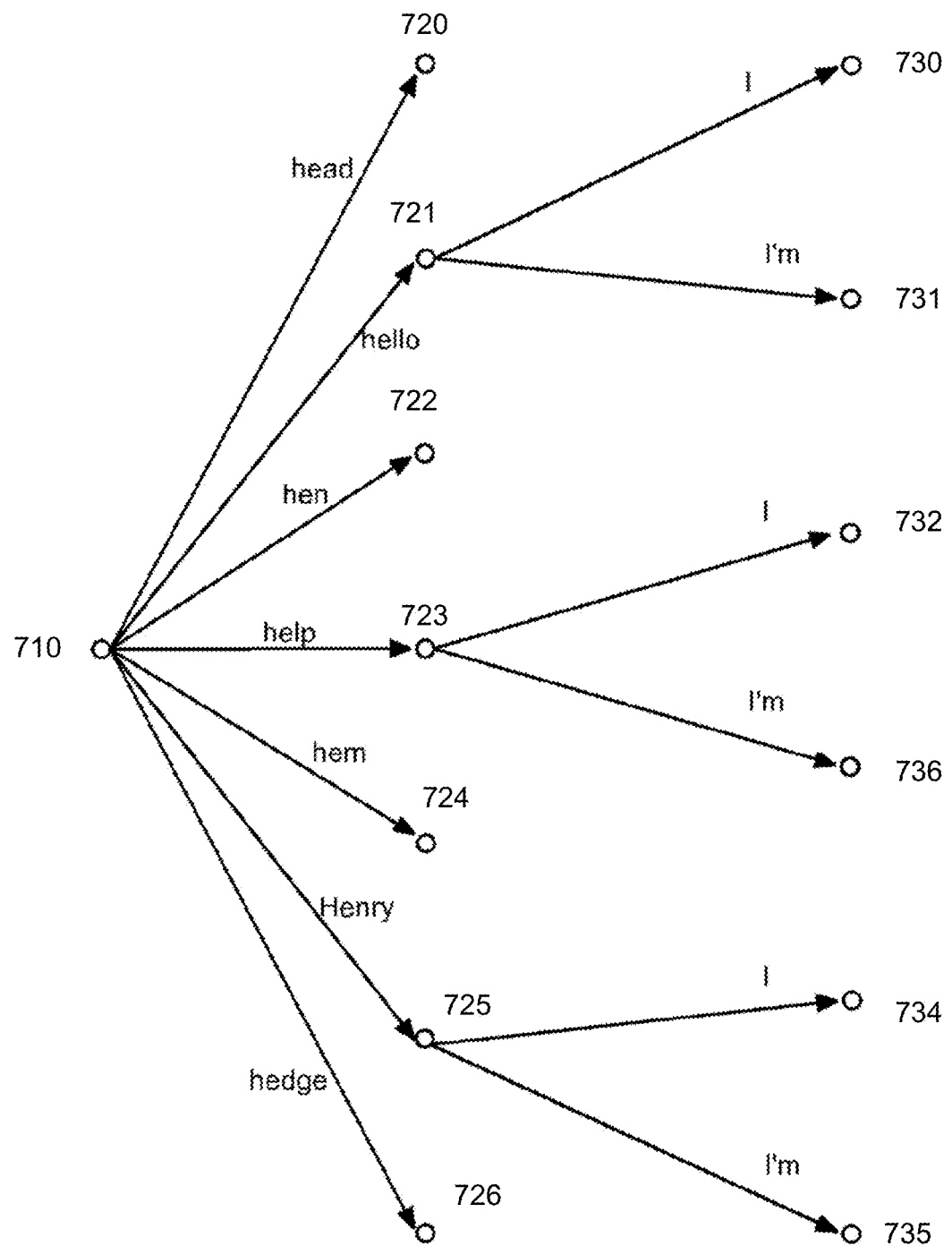
FIG. 7 illustrates a word result network according to one aspect of the present disclosure.

FIG. 7 shows an example of a word result network that may be used by a speech recognition engine 318 for recognizing speech according to some aspects of the present disclosure. A word result network may consist of sequences of words that may be recognized and the likelihood of each sequence. The likelihood of any path in the word result network may be determined by an acoustic model and a language model. In FIG. 7, the paths shown include, for example, "head", "hello I", "hello I'm", "hen", "help I", "help I'm", " "hem", "Henry I", "Henry I'm", and "hedge".

As illustrated in FIG. 7, a word result network may start at initial node 710. At node 710, no words may have been recognized yet as the speech recognition engine 318 commences its processing. From node 710, the speech recognition engine 318 may create arcs and additional nodes where each arc may be associated with a potential word that may be recognized. In some applications, words may be represented by nodes instead of arcs. In FIG. 7, arcs from node 710 to nodes 720 to 726 are labeled with example words that may be recognized by the speech recognition engine 318.

From initial node 710, the speech recognition engine 318 may apply acoustic and language models to determine which of the arcs leaving node 710 are most likely to occur. For an acoustic model employing HMMs, speech recognition engine 318 may create a separate HMM for each arc leaving node 710. Applying the acoustic and language models the speech recognition engine 318 may decide to pursue some subset of the arcs leaving node 710. For example, in FIG. 7, the speech recognition engine 318 may decide to follow the paths starting with "hello", "help", and "Henry" and may decide to stop pursuing the paths starting with "head", "hen", and "hedge" based on the respective scores of those arc, with the speech recognition engine 318 pursuing only the higher scoring arcs in an effort to concentrate computing resources on the arcs most likely to result in a correct result.

The speech recognition engine 318 may return an N-best list of paths along with their respective recognition scores, corresponding to the top N paths as determined by the speech recognition engine 318. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 314. The speech recognition engine 318 may compare the actual correct utterance with the best result and with other results on the N-best list to determine why incorrect recognitions received certain recognition scores. The speech recognition engine 318 may correct its approach (and may update information in the speech storage 320) to reduce the recognition scores of incorrect approaches in future processing attempts.

In one aspect of the disclosure, the speech recognition engine 318 may use a finite state transducer (FST). An FST is a graph that may include all possible words that may be recognized by the speech recognition engine 318. An FST may be static in that it is created in advance and the same FST may be used for the recognition of all utterances.

An FST may include paths for all sequences of words that may be recognized. An FST may be determined and/or minimized to reduce its size. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

Figure 8:
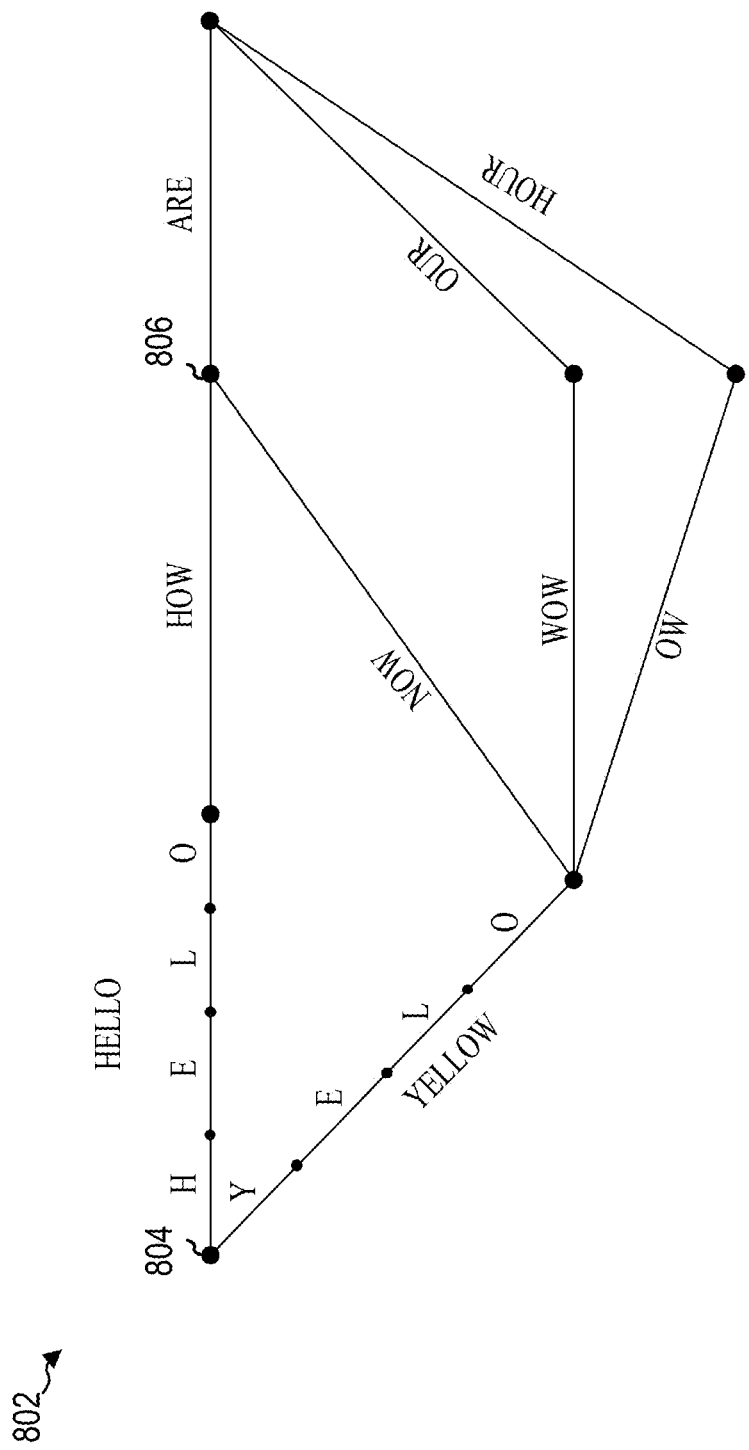
FIG. 8 illustrates a speech recognition lattice according to one aspect of the present disclosure.

The speech recognition engine 318 may combine potential paths into a lattice representing speech recognition results. A sample lattice is shown in FIG. 8. The lattice 802 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 804 and node 806 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 318 as the ASR result for the associated feature vectors.

Following ASR processing, the ASR results may be sent by the ASR module 314 to another component of the ASR device 302, such as the controller/processor 308 for further processing (such as execution of a command included in the interpreted text) or to the output device 307 for sending to an external device.

Figure 9:
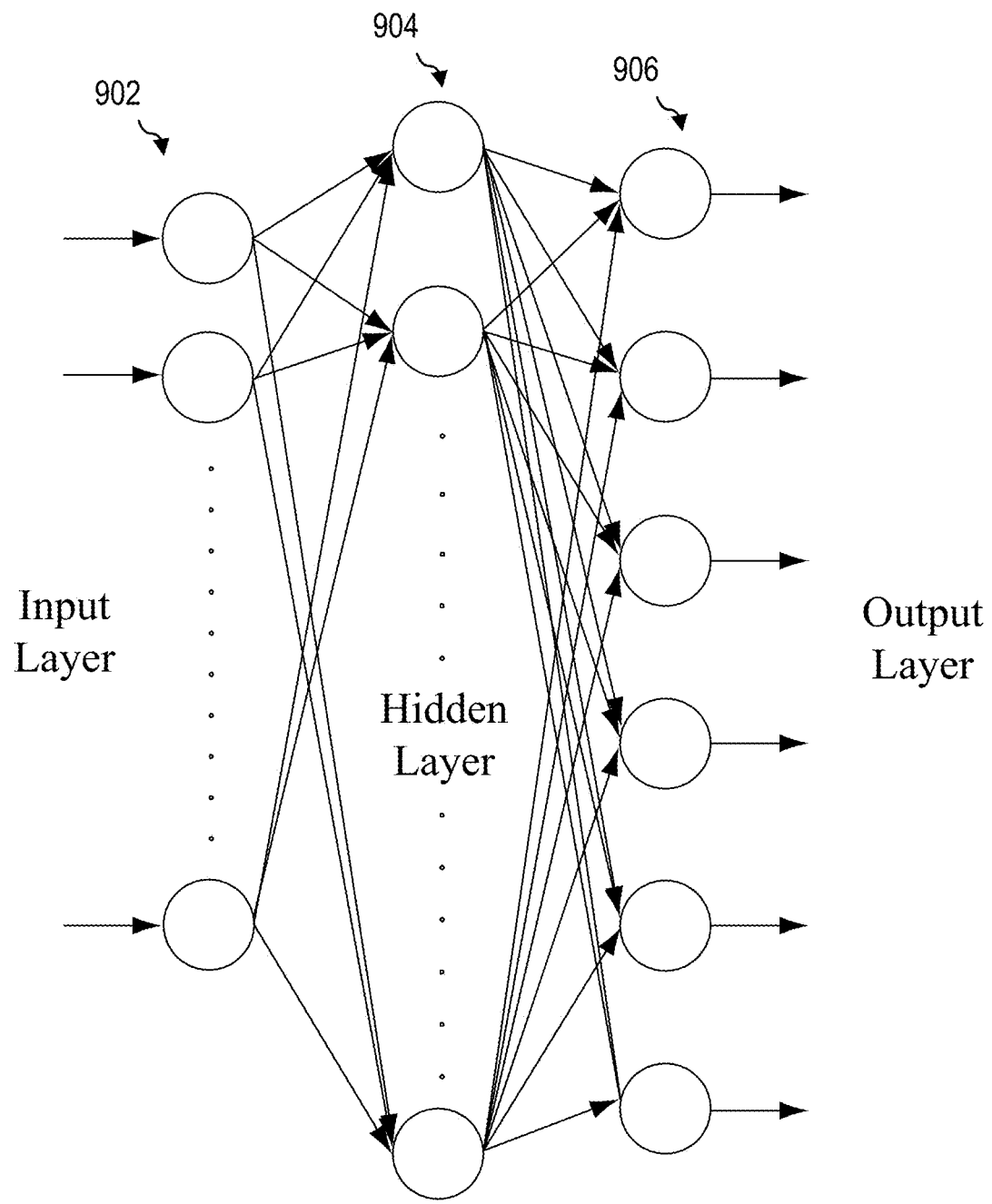
FIG. 9 illustrates a neural network for speech recognition according to one aspect of the present disclosure.

Neural networks may also be used to perform ASR processing including acoustic model processing and language model processing. An example neural network for ASR is illustrated in FIG. 9. A neural network may be structured with an input layer 902, a middle layer 904, and an output layer 906. The middle layer may also be known as the hidden layer. Each node of the hidden layer is connected to each node in the input layer and each node in the output layer. Although illustrated in FIG. 9 with a single hidden layer, a neural network may include multiple middle layers. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 10:
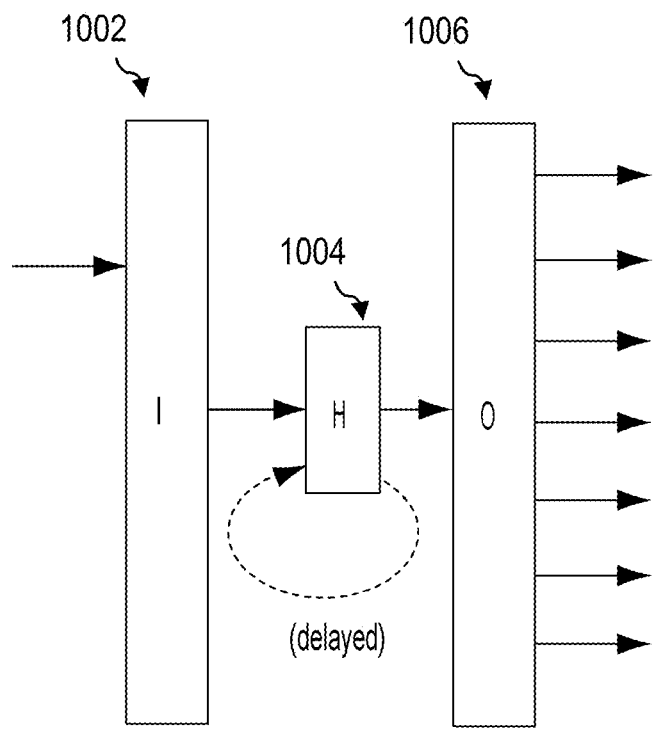
FIG. 10 illustrates a neural network for speech recognition according to one aspect of the present disclosure.

In one aspect, the neural network may be constructed with recurrent connections such that the output of the hidden layer of the network feeds back into the hidden layer again for the next set of inputs. Such a neural network is illustrated in FIG. 10. Each node of the input layer 1002 connects to each node of the hidden layer 1004. Each node of the hidden layer 1004 connects to each node of the output layer 1006. As illustrated, the output of the hidden layer 1004 is fed back into the hidden layer for processing of the next set of inputs.

In the case where an acoustic model uses a neural network, each node of the neural network input layer may represents an acoustic feature of a feature vector of acoustic features, such as those that may be output by AFE 316, and each node of the output layer represents a score corresponding to a subword unit (such as a phoneme, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 10, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. Training of a neural network typically only occurs ahead of time, meaning a neural network is trained and then deployed to an ASR system to perform whatever function is called for, such as acoustic modeling, language modeling, etc.

When receiving audio for speech recognition processing, an ASR device may receive both desired audio, such as speech from a user, as well as undesired audio, such as audio from other people talking to each other, noise from household appliances, etc. In certain circumstances, the speech may be coming from a different direction than the noise. To isolate audio coming from different directions, a device may perform beamforming, a process of isolating certain audio inputs using multiple audio input devices. To perform beamforming, a device may include components for direction-based processing, such as a microphone array and related components. The directional based-processing components may be local to the microphone array and/or may be separate but coupled to the microphone array. The microphone array may be fixed or steerable. When steerable, the microphone array may allow for electronic focusing, where data processing techniques may be employed to focus the microphone array on audio coming from a particular direction, known as a beam. Such steering may be used to isolate the user's speech by focusing the ASR processing on audio received from the direction of the user.

If the direction of audio from the user is known, then the microphone array may be steered in the known direction. The audio from the desired location may then be processed to improve the quality of the desired audio. For example, a device may increase signal-to-noise ratio for an audio signal from the direction of the speaker. Other techniques such as reverberation, echo cancellation, etc., may also be used to improve the reception of the desired audio.

If the direction of the audio from the user is unknown, however, a number of techniques and considerations may be used to determine the direction of the desired speech. For example, audio from the desired user may have a higher intensity at a particular location of the ASR device. When the location of the speaker is unknown relative to the ASR device, beamforming is typically performed with an assumption that the loudest (or highest intensity) audio source is the desired speaker. In this situation, the audio with the higher intensity is amplified while other audio from different directions with lower intensity are attenuated. However, the audio with the higher volume may not be the desired audio (e.g., speech from the user). For example, noise originating from a home appliance in a different direction may have a higher intensity than the speech from the user. As a result, detecting desired audio based on the highest intensity of the audios may produce an erroneous result.

Rather than relying solely on the intensity of received audio to determine the desired audio, aspects of the present disclosure improve the identification of a desired audio by simultaneously performing speech recognition in different directions to isolate the desired speech based on decoding multiple channels of audio. A device may listen to audio from different directions, and process the audio using speech detection and/or speech recognition techniques. The device may then decide which direction includes audio that most closely corresponds to the desired utterance from the user, and focus on the speech recognition results/audio from that direction for further processing. To decode the multiple channels of audio one or more ASR devices may include a beamformer module 128 as shown in FIG. 3. The beamformer module 128 may receive audio signals from a plurality of sources from different directions and simultaneously perform speech recognition in the different directions to isolate desired speech.

In some aspects of the disclosure, the speech recognition is performed simultaneously in different directions to determine a relationship (e.g., similarities) between speech from a desired direction and audio from the other directions. For example, speech recognition (including hypothesis generation for each direction) is performed in different directions simultaneously to determine whether speech is received in each of the directions. The speech recognition, including the generation of the hypothesis for the different directions may be implemented in parallel at a local ASR device and/or a remote device. Accordingly, the most likely direction of the desired speech is identified after at least a portion of the speech recognition results (e.g., hypotheses) for all directions is generated.

In one aspect of the disclosure, each speech recognition result obtained for each of the different directions of the audio is assigned a confidence score representing a probability that the particular result corresponds to the most likely direction and the most likely utterance from the user. In some aspects, the confidence score may be represented as a percentage. The confidence score may be based on a number of factors including, for example, the similarity of the sound/audio from the different directions to models for language sounds (e.g., an acoustic model), the likelihood that a particular word that matches the audio would be included in the sentence at the specific location (e.g., using a language or grammar model) and beam intensity corresponding to a particular direction. For example, the direction corresponding to strongest beam energy for the desired audio may be assigned a higher confidence score. In some instances, the highest confidence score may be selected to represent the direction of the user. In certain aspects, results which do not obtain a threshold confidence score may be discarded, freeing up processing resources for higher scoring results.

The speech recognition may be performed according to a speech recognition model, such as those discussed above. The directional features may be implemented according to a directional model (e.g., trajectory model), which assists the ASR device in determining whether audio from a particular direction includes speech. The speech recognition model and the directional model may be implemented jointly or separately to simultaneously evaluate the speech recognition results in multiple directions. If the models are implemented jointly, the ASR system may attempt to isolate the direction and perform speech recognition at the same time. Such simultaneous processing may be implemented to simultaneously identify a direction of the origination of the speech as well as the transcript (e.g., hypothesis) of the speech. Speech recognition results may be evaluated for all directions, and then the system may determine which direction is the most likely based on the speech recognition results. The direction model may be based on which direction includes audio that sounds most like speech or may be based on other factors such as audio energy or other acoustic information (such as speaker detection), or information obtained from other device components such as a camera, gyroscope, compass, GPS, accelerometer, motion sensor or other components that may assist in determining a user's direction relative to an audio input device. By simultaneously processing the audio in different directions, the ASR device may improve detection of the direction of the user when the user moves in different directions.

In one aspect of the disclosure, when a selected direction for listening to the user is identified based on the simultaneous speech recognition in the different directions, future beams from the selected direction may be more likely to represent the direction of the user relative to beams from other directions. As a result, future beams corresponding to the previously selected direction may be assigned a higher confidence score relative to beams from other directions.

In one aspect of the disclosure, each speech recognition result simultaneously obtained for each of the different directions may be implemented in a finite state transducer (FST). In this aspect, a decoding graph represents the results of the simultaneous performance of speech recognition in the different directions. The decoding graph may represent a search space of possible hypotheses or words and their corresponding directions. For example, N decoding graphs may be implemented for N different beams to facilitate simultaneous decoding of the beams in multiple directions and to facilitate pruning of the results. In this aspect, the different directions of the audio may be paired to the speech recognition result (e.g., transcription or hypothesis) on the graph of the FST, such that the decoding graph transitions through the different directions. Accordingly, the direction of the user and the corresponding result of the speech recognition can be tracked on the decoding graph simultaneously. In one aspect of the disclosure, the direction of the speech may be implemented as a hidden variable that can vary during an utterance from the user and can be determined in the search through the graph.

One way to perform speech recognition in an ASR device and/or network includes implementing a language model that provides an estimate (e.g., probability) for identifying a word sequence $W=(w_1, w_2, w_1 \ldots)$, and an acoustic model represented by a probability density function $p(X|W)$ encoding the message W in a speech/acoustic signal X. Speech recognition is performed to identify the most likely word sequence given by the observed acoustic signal. For example, the speech recognition is performed to maximize a probability of W (i.e., $p(W)$) given the speech signal X, or equivalently, to maximize the product of the probability of W and the probability density function as illustrated in the equation $p(X,W)=p(X|W)\,p(W)$.

Aspects of the present disclosure improve the implementation of speech recognition by introducing a variable that represents a direction D of the user or the origination of the desired audio with respect to the ASR device. For example, the direction D may be implemented as a hidden variable. The following equation represents the improved speech recognition implementation that accounts for the direction of the user as well as the features of audio signal representing user's speech in all directions.

$$p(X',W)=\max_D p(X',W,D)=\max_D p(X'|D,W)p(W)p(D)$$

where X' represents the speech signal from the user in all directions or multiple directions and D represents a direction of the user.

In one aspect of the disclosure, the direction, D, of the user may be stationary throughout the utterance. In other aspects of the disclosure, the direction, D, of the user may be time dependent or non-stationary as illustrated by $D=d_1, \ldots, D_t$. As noted, the speech recognition engine 318 may use a number of techniques to match feature vectors to phonemes or other phonetic units, such as biphones, triphones, etc. One common technique is using Hidden Markov Models (HMMs). In some aspects of the disclosure, the non-stationary direction may be modeled as a Markov chain as $p(D) \sim p(d_t|d_{t-1})$. The (initial) distribution representing the speaker's directions $p(d_1)$ may be based on a location of the user in a previous interaction.

In one aspect of the disclosure, the probability density function $p(X'|D,W)$ may be approximated as $p(X(D)|W) p(E|D)$, where $X(D)$ represents standard acoustic features extracted from the beam-formed signal for direction D and E is a directional distribution of energy (or other measure of audio activity). The approximated representation, $p(X(D)|W) p(E|D)$, allows for separation of content-dependent and direction-dependent aspects of the beam-formed signal. The first factor, $p(X(D)|W)$, is based on a standard non-direction aware acoustic model and can be trained conventionally. The second factor $p(E|D)$ models whether the source of the received beam-formed signal is in direction D. In this case, it is assumed that if the user is speaking from direction D, then E should have a maximum at D. In some instances, a speaker with a higher beam intensity or louder voice may be deemed the desired speaker based on the $p(E|D)$ models.

Different ways of decoding multiple channels of audio are also possible. Assuming a stationary speaker, in one aspect, N separate decoders are implemented for each direction d. A time dependent direction, $d_t$, may be modeled as an additional latent or hidden variable in the HMM decoder. The implementation of the time dependent direction, $d_t$, allows for a non-stationary speaker. Through beam pruning, unlikely directions may be eliminated from a search space, yielding improvements to the efficiency (e.g., run-time efficiency) of the multi-directional implementation relative to previous implementations. In some aspects, $d_t$ is independent and identically distributed (iid). We get $\Sigma_d \, p(e_t|d) \, p(x_t(d)|s_t)$, i.e., frame-wise weighted score combination, where $e_t$ is the energy in a direction at a particular time and $s_t$ is an HMM state at a particular time.

In one aspect of the disclosure, multiple speech recognition tasks may be performed, where each speech recognition task uses data from a single direction. For example, a speech recognition task may be performed for each channel of a multi-channel beamformer. Because the speech recognition models are trained to identify speech, the speech recognition task with the highest quality speech signal as input will generally provide the speech recognition results with the highest score. Upon completion of the speech recognition tasks, the direction of the user and the speech recognition results can be determined by selecting the speech recognition task that produced the highest likelihood.

In one aspect of the disclosure, the direction may be selected dynamically during speech recognition. When the user is walking, for example, the best direction may change. In this case, better speech recognition results may be obtained by updating the direction as speech is received. For a speech input being processed at a given time, the speech input may be processed for each channel to determine which channel most likely contains the user speech. The channel may be selected using different techniques. For example, the channel with the highest energy may be selected. Further, the channel that likely contains speech may be determined by a voice activity detector. Alternatively, speech recognition may be performed incrementally for the speech input from each channel (for the current time) while continuing to use the channel that provided the highest likelihood and discard the others. Further, the channels may be weighted to make some channels more likely than others. For example, a higher weight may be placed on the current channel to prevent too many channel changes, and an adjacent channel may be weighted higher than a more distant channel as a user is more likely to walk to the adjacent channel than a distant channel corresponding to the other side of the room. In some embodiments, the channel weights may be modeled as a Markov chain.

In one aspect of the disclosure, simultaneous speech recognition may be performed on multiple channels. In conventional speech recognition systems, one channel is processed at a time, and the frames corresponding to that channel are processed in sequence. Possible implementations for performing simultaneous speech recognition on multiple channels include: (1) using speech recognition models that are trained on a supervector consisting of a concatenation of the feature vectors for each channel; (2) using conventional speech recognition models but using the feature vector from each channel as an alternative when generating the result network; and (3) using neural networks to simultaneously select the direction and determine speech recognition results.

A result network is a structure that may be created during recognition. A result network may be created using input data and may indicate likely sequences of speech recognition units (e.g., HMM state, phoneme in context, or phoneme) that may be recognized from the data. A result network may be represented in any suitable form and the disclosure is not limited to any particular structure for a result network. In some aspects, an HMM result network may be represented by nodes and arcs, and the HMM state being recognized may be associated with the arcs and/or the nodes. In some aspects, a result network may be a tree, a lattice, or a directed graph. The nodes and /or arcs in a result network way have a weight, and the weight may indicate a likelihood or a cost of a path or a portion of a path in a result network.

The process of recognizing speech may involve multiple networks such as a word network, language model network, speech unit network, Gaussian mixture model (GMM) network and HMM network. For example, a word result network is described above in reference to FIG. 7. A speech recognition parameter, e.g., speech-unit-in-context, may be modeled as an HMM comprising a number of states, and there may be a different HMM for each speech recognition parameter. An HMM network may include a HMM result network that indicates sequences of HMM states being recognized. An HMM network may include a set of tokens indicating the HMM states known by the ASR system. An HMM result may include an HMM model, indicating the sequences of states in each HMM and which may be represented as a graph. Each state of an HMM may consist of a mixture of Gaussian probability densities.

Regarding the supervector approach, the feature vectors computed for each channel may be concatenated into a longer vector. For example, if each channel has a feature vector of length 40 and there are 6 channels, then the supervector would have length 240. Speech recognition models may be generated corresponding to the supervectors. For example, a corpus of multichannel data could be used to train an acoustic model based on supervectors. By training speech recognition models with multi-channel data as supervectors, the speech recognition models may be able to learn to recognize speech while noise is present in other channels, to learn to recognize speech when a user is moving across channels, and to learn to recognize speech where multiple speakers are present. The speech recognition models trained with the supervectors may then be implemented in a system that performs speech recognition based on supervectors.

Simultaneous speech recognition on multiple channels may also be implemented with feature vectors from different channels. The feature vectors from the different channels may be used as alternatives when generating a result network. FIG. 7 illustrates a word result network that may be built using a conventional speech recognition engine operating on a single channel of speech. The word result network of FIG. 7 is built based on a single sequence of feature vectors from a single channel. When processing multiple channels of speech, however, each channel of speech may have a sequence of frames, and thus the frames for each channel of speech may be processed simultaneously in building the result network. An exemplary HMM result network for multiple channels of speech is illustrated by FIG. 11.

Figure 11:
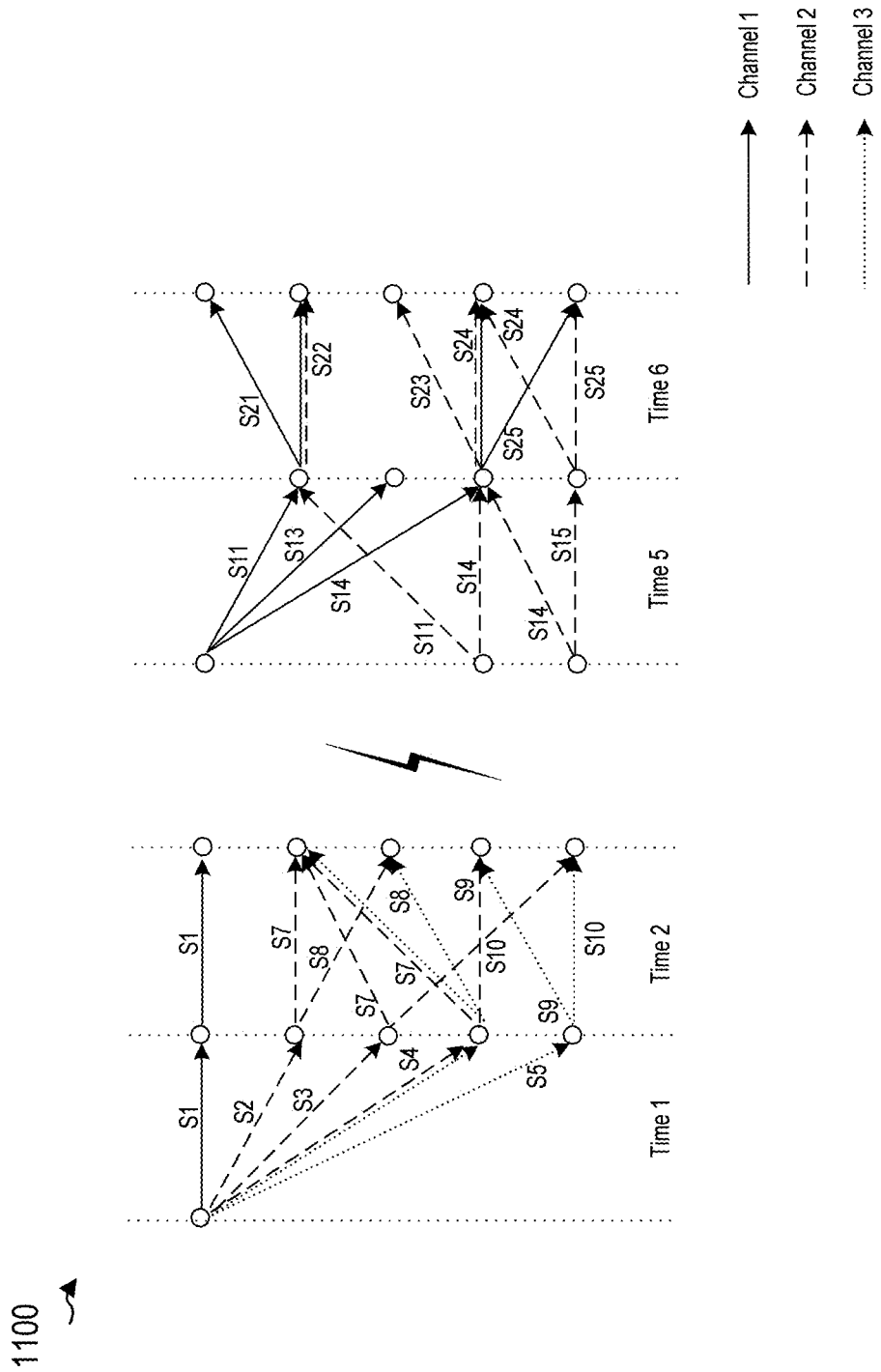
FIG. 11 illustrates an HMM result network according to one aspect of the present disclosure.

FIG. 11 shows an example result network created when processing multiple channels of speech simultaneously. Different line styles indicate hypotheses that may be generated from different channels. For example, a solid line may represent channel 1, a dashed line may represent channel 2, and a dotted line may represent channel 3. Each channel provides an indication of a potential HMM state. Although FIG. 11 shows a result network based on HMM states, in practice any type of result network may be used. The HMM result network 1100 may proceed from left to right where the left-most node indicates the beginning of an utterance. Each arc of HMM result network 1100 may represent an HMM state and sequences of arcs may indicate a sequence of HMM states.

At the first time instance (Time 1) in FIG. 11, there are multiple arcs corresponding to states S1 through S5. State S1 corresponds to channel 1, states S2, S3, and S4 correspond to channel 2, and states S4 and S5 correspond to channel 3. Each time instance, e.g., Time 1, may correspond to a predefined time period (e.g., 10ms) which represents an audio frame. As illustrated, the possible HMM states at the end of Time 1 are S1, S2, S3, S4 and S5, the possible states at the end of Time 2 are S1, S7, S8, S9 and S10, the possible states at the end of Time 5 are S11, S13, S14 and S15 and the possible states at the end of Time 6 are S21, S22, S23, S24 and S25. A probability value and/or score may be associated with each of the potential HMM states. In some aspects, the system may select a potential HMM state based on the probability value and/or score associated with each of the potential HMM states. However, in some instances, the selection may be unnecessary when the HMM states of the channels are substantially similar or point to similar results. For example, the selection may be unnecessary when the potential HMM state patterns of each channel point to a same phoneme and the phonemes point to the same word.

For purposes of illustration, at the beginning of received audio (i.e., at Time 1), the user may be between channel 2 and 3, resulting in the user's speech being picked up by both channels 2 and 3. Channel 1, however, may only be picking up non-speech audio, such as audio from a dishwasher. At any time instance, only the highest scoring hypotheses may be retained. For example, there may be other channels (such as channels 4, 5 and so on) that do not have significant sounds or sounds that do not match any of the speech models. For the next few time instances (e.g., Time 2 through Time 4 (not pictured)), the user may stay in the same location, and HMM states are shown corresponding the user's speech where the states are generated from the frames corresponding to channels 2 and 3, while channel 1 continues to generate frames corresponding to the dishwasher.

At Time 5, the user may walk towards the dishwasher, and for the next few time instances (e.g., Time 5 and Time 6), the frames from channels 1 and 2 generate states corresponding to the user's speech, and channel 3 no longer generates any frames. At each time instance, the frames from each of the channels detecting audio may be scored against the HMM states, and highest scoring combinations of frames and HMM states may be added to the result network. At the conclusion of performing speech recognition on the user's speech, a highest scoring hypothesis may be selected as most likely corresponding to the user's speech, and frames from each of the three channels may be used to generate this hypothesis.

In some aspects, there may or may not be constraints placed on HMM states generated by different channels. In some aspects, there may be no constraints so that an HMM state generated by channel 1 may be followed by an HMM state generated by channel 4, even though the two channels point in opposite directions. In some aspects, constraints may be imposed. For example, a penalty may be imposed based on a distance between channels. There may be no penalty for the same channel, a smaller penalty for adjacent channels, and a larger penalty for non-adjacent channels.

In some aspects, channel pre-selection may be performed before using a frame of speech from a channel for speech recognition. For example, techniques like energy detection or voice activity detection may be used to select channels that most likely contain speech. By pre-selecting channels, the speech recognition may be more computationally efficient.

In some aspects, processing multiple channels of speech simultaneously may allow a speech recognition system to track a person as the person walks around a room. In other aspects, processing multiple channels of speech simultaneously may allow a speech recognition system to recognize the speech of a user, even where there is a louder sound (such as a dishwasher) coming from a different direction. In some aspects, processing multiple channels of speech simultaneously may allow for the recognition of multiple speakers simultaneously. For example, if a first user is in channels 1 and 2 and a second user is in channels 4 and 5, the result network may contain a complete speech recognition result for the first user and another complete speech recognition result for the second user.

As another alternative, the simultaneous speech recognition for different directions may be implemented in conjunction with a neural network. Traditionally, a neural network is trained with a single channel or direction of data. Instead, a neural network may be trained with multi-channel data, such as where each of the channels is a different direction from a microphone array. Where the neural network is trained on multi-channel data, it can be trained to simultaneously select the direction of speech and perform speech recognition. The training data may include data other than speech, e.g., music or non-speech noise. For example, music may originate from a source in one direction, while speech may originate from a different direction. A neural network trained in this way may be able to track the user as the user walks around the room. As the user moves, the neural network may be able to automatically select the most relevant data from each of the channels to better recognize the user's speech.

Figure 12:
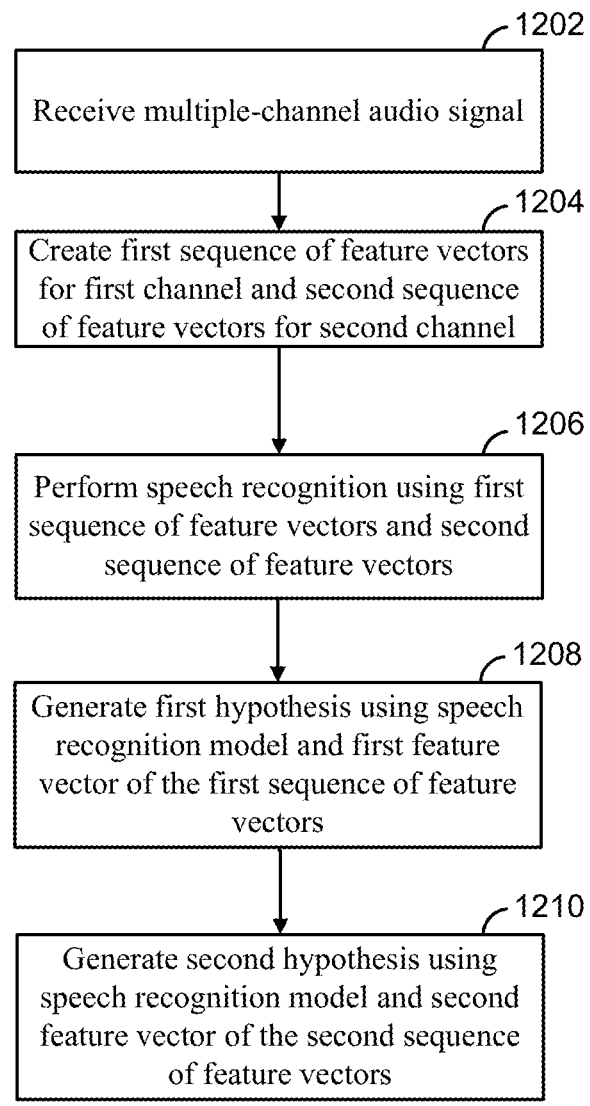
FIG. 12 illustrates a method for processing speech based on decoding multiple channels of audio received from a beamformer according to aspects of the present disclosure.

FIG. 12 illustrates a method for processing speech based on decoding multiple channels of audio according to aspects of the present disclosure. The method may be implemented at the beamformer module 128, microphone array 126, ASR device 100 and/or a remote speech processing device (e.g., ASR device 302). At block 1202, the ASR device 100, may receive a multiple-channel audio signal including a first channel and a second channel. The first channel and second channel may be created using a beamformer and a microphone array. The first channel represents audio from a first direction, and the second channel represents audio from a second direction. At block 1204, the ASR device 100 may create a first sequence of feature vectors for the first channel and a second sequence of feature vectors for the second channel. At block 1206, the ASR device 100, may perform speech recognition using the first sequence of feature vectors and the second sequence of feature vectors. Performing speech recognition may include generating a first hypothesis, at block 1208, using a speech recognition model and a first feature vector of the first sequence of feature vectors. Performing speech recognition may also include generating a second hypothesis, at block 1210, using the speech recognition model and a second feature vector of the second sequence of feature vectors. The second hypothesis is subsequent to the first hypothesis in a speech recognition result network.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for performing speech recognition, the method comprising:
   receiving a multiple-channel audio signal comprising a first channel and a second channel, wherein the first channel and second channel are created using a beamformer and a microphone array, the first channel representing audio from a first direction, and the second channel representing audio from a second direction;
   creating a first sequence of feature vectors for the first channel and a second sequence of feature vectors for the second channel;
   performing speech recognition using the first sequence of feature vectors and the second sequence of feature vectors, wherein performing speech recognition comprises:
      generating a first hypothesis using a speech recognition model and a first feature vector of the first sequence of feature vectors;
      determining a first confidence score for the first hypothesis;
      generating a second hypothesis using the speech recognition model and a second feature vector of the second sequence of feature vectors, wherein the second hypothesis is subsequent to the first hypothesis in a speech recognition result network;
      determining a second confidence score for the second hypothesis;
      determining that the first confidence score is greater than the second confidence score;
      determining a speech recognition output using the first hypothesis;
      determining that the first direction is associated with a direction of a speaker;
      determining, at a later time, a new sequence of feature vectors corresponding to further audio from the first direction;
      performing speech recognition on the new sequence of feature vectors to obtain a new hypothesis; and
      increasing a confidence score of the new hypothesis.

2. The method of claim 1, further comprising selecting the first channel based at least in part on a characteristic of audio of the first channel.

3. The method of claim 2, wherein the characteristic comprises an energy of the audio of the first channel or a presence of speech in the audio of the first channel.

4. The method of claim 1, wherein:
   the multiple-channel audio signal further comprises a third channel;
   the method further comprises creating a third sequence of feature vectors for the third channel, wherein the third sequence of feature vectors corresponds to a same time as the first sequence of feature vectors; and
   performing the speech recognition further comprises:
      generating a third hypothesis using a speech recognition model and a third feature vector of the third sequence of feature vectors, wherein the generation of the third hypothesis is performed substantially simultaneously to generation of the first hypothesis in the speech recognition result network;
      determining a third confidence score for the third hypothesis using the direction of the speaker; and
      selecting the first hypothesis over the third hypothesis based on the first confidence score being higher than the third confidence score.

5. The method of claim 1, wherein the first hypothesis comprises a hidden Markov model state, a phoneme in context, a phoneme, or a word.

6. A computing device, comprising:
   at least one processor;
   a memory device including instructions operable to be executed by the at least one processor to perform a set of actions, configuring the at least one processor:
      to receive a multiple-channel audio signal comprising a first channel and a second channel, the first channel and second channel created using a beamformer and a microphone array, the first channel representing audio from a first direction, and the second channel representing audio from a second direction;
      to create a first sequence of feature vectors for the first channel and a second sequence of feature vectors for the second channel;
      to process a first feature vector of the first sequence of feature vectors, the first feature vector corresponding to a first frame, to generate a first speech recognition hypothesis;

to process a second feature vector of the second sequence of feature vectors to generate a second speech recognition hypothesis, the second feature vector corresponding to a second frame, wherein the first frame and second frame correspond to a first time;

to determine a first confidence score for the first speech recognition hypothesis;

to determine a second confidence score for the second speech recognition hypothesis;

to select the first speech recognition hypothesis based on the first confidence score being higher than the second confidence score;

to output speech recognition results using the first speech recognition hypothesis;

to determine that the first direction is associated with a direction of a speaker;

to determine, at a later time, a new sequence of feature vectors corresponding to further audio from the first direction;

to perform speech recognition on the new sequence of feature vectors to obtain a new speech recognition hypothesis; and to increase a confidence score of the new speech recognition hypothesis.

7. The computing device of claim 6, wherein the at least one processor is further configured to process the first feature vector and the second feature vector substantially simultaneously.

8. The computing device of claim 6, wherein the at least one processor is further configured:

to concatenate the first feature vector and the second feature vector to create a concatenated feature vector; and to process the first feature vector and the second feature vector by processing the concatenated feature vector.

9. The computing device of claim 8, wherein the at least one processor is further configured to process the first feature vector and the second feature vector using an acoustic model trained with concatenated feature vectors.

10. The computing device of claim 6, wherein the at least one processor is further configured to process the first feature vector and the second feature vector to generate at least one first speech recognition hypothesis by using a neural network speech recognition model.

11. The computing device of claim 6, wherein the at least one processor is further configured to generate a speech recognition result network comprising the first speech recognition hypothesis and the second speech recognition hypothesis.

12. The computing device of claim 11, wherein the first confidence score depends at least in part on a difference between the first direction and the direction of the speaker.

13. A non-transitory computer-readable storage medium storing processor-executable instructions for controlling a computing device, comprising:

program code to receive a multi-channel audio signal comprising a first channel and a second channel, the first channel comprising audio from a first direction and the second channel comprising audio from a second direction;

program code to create a first sequence of acoustic features for the first channel and a second sequence of acoustic features for the second channel;

program code to process acoustic features from the first sequence corresponding to a first time frame to generate a first speech recognition hypothesis;

program code to process acoustic features from the second sequence corresponding to the first time frame to generate a second first speech recognition hypothesis;

program code to determine a first confidence score for the first speech recognition hypothesis;

program code to determine a second confidence score for the second speech recognition hypothesis;

program code to select the first speech recognition hypothesis based on the first confidence score being higher than the second confidence score;

program code to output speech recognition results using the first speech recognition hypothesis;

program code to determine that the first direction is associated with a direction of a speaker;

program code to determine, at a later time, a new sequence of feature vectors corresponding to further audio from the first direction;

program code to perform speech recognition on the new se sequence of feature vectors to obtain a new speech recognition hypothesis; and program code to increase a confidence score of the new speech recognition hypothesis.

14. The non-transitory computer-readable storage medium of claim 13, further comprising program code to process the acoustic features corresponding to the first time frame substantially simultaneously.

15. The non-transitory computer-readable storage medium of claim 13, further comprising program code:

to concatenate the acoustic features corresponding to the first time frame to create concatenated features; and to process the acoustic features corresponding to the first time frame by processing the concatenated features.

16. The non-transitory computer-readable storage medium of claim 15, further comprising program code to process the acoustic features corresponding to the first time frame using an acoustic model trained with concatenated features.

17. The non-transitory computer-readable storage medium of claim 13, further comprising program code to process the acoustic features corresponding to the first time frame using a neural network speech recognition model.

18. The non-transitory computer-readable storage medium of claim 13, further comprising program code to generate a speech recognition result network comprising the first speech recognition hypothesis and the second speech recognition hypothesis.

19. The non-transitory computer-readable storage medium of claim 18, wherein the first confidence score depends at least in part on a difference between the first direction and the direction of the speaker.

* * * * *